US006686007B2

United States Patent
Murphy

(10) Patent No.: US 6,686,007 B2
(45) Date of Patent: *Feb. 3, 2004

(54) MOLDED PLASTIC COMPONENT HAVING ENHANCED SURFACE FINISH

(75) Inventor: John F. Murphy, Imlay City, MI (US)

(73) Assignee: Patent Holding Company, Fraser, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 314 days.

(21) Appl. No.: 09/148,262

(22) Filed: Sep. 4, 1998

(65) Prior Publication Data

US 2001/0009702 A1 Jul. 26, 2001

(51) Int. Cl.[7] .................. B29D 22/00; B29D 23/00; B32B 1/08
(52) U.S. Cl. .................................... 428/35.7
(58) Field of Search ................ 428/35.7, 543, 428/423.1, 500, 521, 523, 36.9, 36.91; 264/454; 215/12.2, 379

(56) References Cited

U.S. PATENT DOCUMENTS

| | | | |
|---|---|---|---|
| 5,300,334 A | * | 4/1994 | Niederst et al. ............ 428/35.7 |
| 5,431,367 A | | 7/1995 | Baumgartner et al. |
| 5,468,141 A | | 11/1995 | Iwami et al. ............... 425/542 |
| 5,535,980 A | | 7/1996 | Baumgartner et al. ... 249/114.1 |
| 6,033,724 A | | 3/2000 | Molitor |

OTHER PUBLICATIONS

Cover letter from Daniel B. Crosby to John Murphy dated Aug. 22, 2000, 1 page, and Endura sales brochure, 6 pages.

* cited by examiner

Primary Examiner—Kenneth R. Rice
(74) Attorney, Agent, or Firm—Brooks Kushman P.C.

(57) ABSTRACT

A molded plastic component having enhanced surface finish is molded within a mold having at least one metal base, a mold cavity, and at least one self-lubricating surface layer which defines the plastic component within the mold cavity. The self-lubricating surface layer includes a porous metallic skin integrally connected to and extending from an interior surface of the at least one metal base and lubricating particles disposed on the skin and in pores of the skin. The lubricating particles are bonded together to form a sealed surface of the at least one self-lubricating surface layer such that the molded plastic component has the enhanced surface finish. The metallic skin includes a plurality of spaced, sinusoidally-shaped projections of autocatalytic nickel alloy. The lubricating particles are preferably submicron-sized particles of low friction fluoropolymers. The mold may be an injection mold, a compression mold, a blow mold or a vacuum mold. When the mold is an injection mold, other parts of the mold such as an ejector pin, a core pin, a cooling line and a resin flow path may also have a substantially identical self-lubricating surface layer integrally formed thereon to provide non-stick surfaces thereof. The plastic component may be made of DYM, ABS, Santoprene®, polypropylene, SMC, TPO, TPU, or other plastic compound.

24 Claims, 4 Drawing Sheets

MOLDED PLASTIC COMPONENT HAVING ENHANCED SURFACE FINISH

TECHNICAL FIELD

This invention relates to molded plastic components and, in particular, to molded plastic components having enhanced surface finish.

BACKGROUND ART

Plastic components can be molded in a wide variety of molds such as injection molds, compression molds, vacuum molds, RIM molds, and blow molds. A common problem in the molding of plastic components is that the solidified plastic component often sticks to the component-defining surfaces of the mold. As a result, the mold cycle times are unnecessarily extended. Also, the article-defining surface as well as the resin flow path within the mold must be cleaned and/or lubricated on a periodic basis to ensure that subsequently molded plastic components are not contaminated with plastic that was previously stuck within the mold. This problem is especially acute where color of the plastic component has been changed.

One way of reducing this sticking problem is to utilize a mold release spray or lubricant wherein the spray is deposited on the surface layers which define the article-defining cavity. However, the use of such a spray is not only time-consuming but expensive.

Another way of reducing the sticking within the article-defining cavity is to incorporate release agents within the plastic itself. However, the use of such release agents present other problems including the expense of incorporating such release agents within the plastic material.

Another way of reducing the sticking problem is to use increased molding pressures. However, here again, the use of increased molding pressures adds even more problems to the molding process.

The U.S. patent to Iwami et al. U.S. Pat. No. 5,468,141 discloses a core block including a release insulating layer on a cavity side thereof wherein the release insulating layer is made of a material selected from the group consisting of fluorocarbon resins, fluorocarbon resin composite materials, silicon resin composite materials, and metal platings with fluorocarbon resin dispersion. The patent is concerned with developing a new molding technology for obtaining good articles at a relatively low pressure.

The U.S. patent to Baumgartner et al. U.S. Pat. No. 5,535,980 discloses a mold having an insulating layer and a second layer of metal particles suspended in resin deposited on the insulating layer. The patent is concerned with a procedure for producing a metal surface on a layer of low thermoconductivity.

SUMMARY OF THE INVENTION

An object of the present invention is to provide a molded plastic component having enhanced surface finish wherein the plastic component is molded within a mold having at lest one self-lubricating surface layer which provides at least one substantially non-stick surface to eliminate the need to spray the interior of the mold with a lubricant.

Another object of the present invention is to provide a molded plastic component having enhanced surface finish and which is molded within a mold having at lest one self-lubricating surface layer which allow the molding of the plastic component at reduced cycle times.

Still another object of the present invention is to provide a molded plastic component having enhanced surface finish wherein the plastic component is molded in a mold having at least one self-lubricating surface layer which has an optimum combination of release (non-stick), low friction, dry lubrication, corrosion resistance, wear resistance, and hardness properties that typically could not be provided or maintained from traditional plating, solid film lubricants and coatings.

Another object of the present invention is to provide a molded plastic component having enhanced surface finish wherein the plastic component is molded within a mold having at least one self-lubricating surface layer which allows the use of reduced molding pressures, enhances plastic flow and flow pressures within the mold and reduces plastic flow and nit lines.

It is another object of the present invention to provide a molded plastic component having enhanced surface finish wherein the plastic component is molded within a mold having a relatively thin, self-lubricating surface layer formed on at least one interior, component-defining surface of the mold.

Yet still another object of the present invention is to provide a molded plastic component having enhanced surface finish wherein the plastic component is molded within a mold having a self-lubricating surface layer which eliminates or reduces the need to formulate the plastic of the plastic component to include a release agent.

Still another object of the present invention is to provide a molded plastic component having enhanced surface finish wherein the plastic component is molded within a mold having a self-lubricating surface layer formed on substantially all mold components including cavity, core, slides, lifters, core pins, manifolds, mixer blocks, nozzles, sprue bushings, ribs, bosses, etc. The surface layer may be formed on one or more ejector pins of the mold which, in turn, help to define the mold cavity in which the plastic component is molded.

Another object of the present invention is to provide a molded plastic component having enhanced surface finish wherein the plastic component is molded within a mold having a self-lubricating surface layer which defines a water line wherein impurities within the water flowing through the water line do not build-up within the water line to ensure the proper functioning of the mold whereby the plastic component is properly molded in the mold.

Yet still another object of the present invention is to provide a molded plastic component having enhanced surface finish wherein the plastic component is molded within a mold having an exterior, self-lubricating surface layer which allows the exterior of the mold to be cleaned very quickly thereby reducing down time of the mold.

It is still another object of the present invention is to provide a molded plastic component having enhanced surface finish wherein the plastic component is molded within a mold having a self-lubricating surface layer which does not flake during use of the mold.

Yet still another object of the present invention is to provide a molded plastic component having enhanced surface finish wherein the plastic component is molded within a mold having a self-lubricating surface layer which is compatible for use in injection molds, Reaction Injection Molding (RIM), compression molds and vacuum molds and wherein the plastic may include such plastics as DYM® polyester elastomers available from DuPont, acrylonitrile-butadiene-styrene (ABS), SANTOPRENE® thermoplastic elastomer available from Advanced Elastomer Systems, polypropylene, sheet molding compound (SMC), thermoplastic olefin elastomer (TPO), thermoplastic polyurethane (TPU) and other plastic compounds such as polyurethane or polyurea.

In carrying out the above objects and other objects of the present invention, a plastic component molded within a mold having at least one metal base, a mold cavity, and at least one self-lubricating surface layer having a substantially uniform thickness and which defines the plastic component within the mold cavity is provided. The at least one self-lubricating surface layer includes a porous metallic skin integrally connected to and extending from an interior surface of the at least one metal base and lubricating particles disposed on the skin and in pores of the skin. The lubricating particles are bonded together to form a sealed surface of the at least one surface layer. In this way, the molded plastic component has an enhanced surface finish.

Preferably, the interior surface of the at least one metal base has substantially the same shape as the sealed surface.

Also, preferably, the surface layer has a substantially uniform thickness in the range of 0.0007 to 0.001 inches. Still preferably, the substantially uniform thickness is approximately 0.001 inches.

The metallic skin typically includes a plurality of sinusoidally-shaped projections. Also, preferably, the metallic skin is a nickel alloy such as an autocatalytic nickel alloy.

The lubricating particles are preferably submicron-sized particles of low friction fluoropolymers.

The plastic component may be injection molded, compression molded, or blow molded when the mold has a pair of metal bases and wherein each of the metal bases has a self-lubricating surface layer as described above. When the plastic component is vacuum molded, only a single metal base need be provided with a single, self-lubricating surface layer described above.

The plastic of the plastic component may comprise such plastics such as DYM, ABS, SANTOPRENE® thermoplastic elastomer available from Advanced Elastomer Systems, polypropylene, SMC (with glass filler), TPO, TPU and other plastic compounds.

When the mold is an injection mold having an ejector pin, the ejector pin also has a self-lubricating surface layer as described above which helps to define the mold cavity.

Also, when the mold is an injection mold, the mold may have a core pin having a self-lubricating surface layer as described above which also helps to define the mold cavity.

The mold may have a cooling line formed therein the at least one metal base wherein the cooling line has a self-lubricating surface layer also as described above.

When the mold has a resin flow path extending from an outer surface of the mold to the mold cavity, the resin flow path may also have a self-lubricating surface layer as described above. Also, the outer surface of the mold may also have a self-lubricating surface layer as described above.

The advantages accruing to the molded plastic component having enhanced surface finish are numerous. For example, the enhanced surface finish can be provided using lower molding pressures, reduced cycle time and without the need for the use of release agents either on the component-defining surface of the mold or within the plastic itself.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
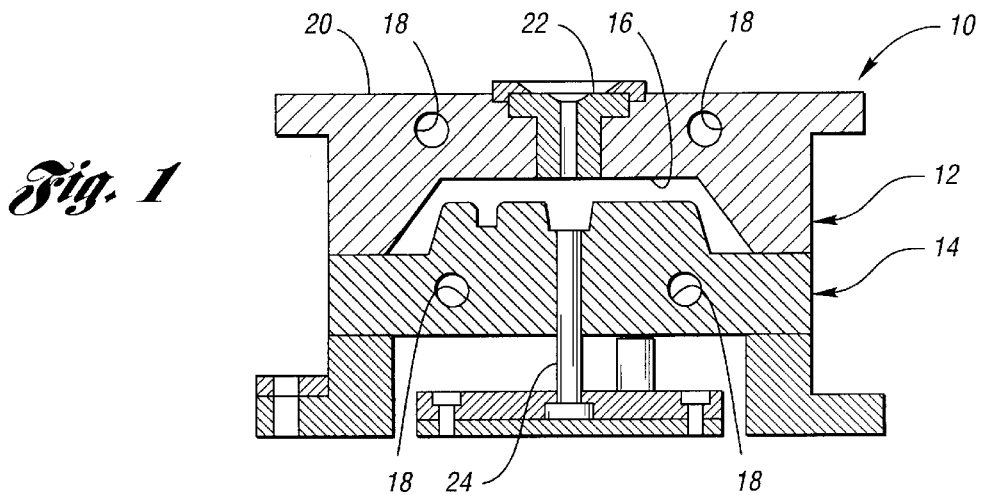
FIG. 1 is a schematic view in cross-section of an injection mold for molding plastic components having enhanced surface finish in accordance with the present invention.

Referring now to the drawing Figures, there is illustrated in FIGS. 1–4 various tools or molds which can be provided with self-lubricating surface layers to form molded plastic components having enhanced surface finish of the present invention. FIG. 1 illustrates a conventional injection molding machine or tool, generally indicated at 10. The mold 10 includes a first mold half or metal base, generally indicated at 12, and a second mold half or metal base, generally indicated at 14, which together define an article or component-defining mold cavity 16. Each of the metal bases 12 and 14 includes one or more cooling lines 18 through which a cooling liquid such as water flows to cool the mold 10 during use.

The mold 10 also includes a resin flow path which extends from an outer exterior surface 20 of the first mold half 12 through a sprue 22 to the article-defining mold cavity 16. The resin flow path may also include a runner and a gate, both of which are not shown for purposes of simplicity.

The mold 10 also includes one or more ejector pins 24 slidably secured within the second mold half 14 and which also helps to define the article-defining cavity 16 in the closed position of the mold 10 as indicated in FIG. 1. The ejector pin 24 operates in a well known fashion to remove a molded article or component from the article-defining cavity 16 in the open position of the mold 10.

Figure 2:
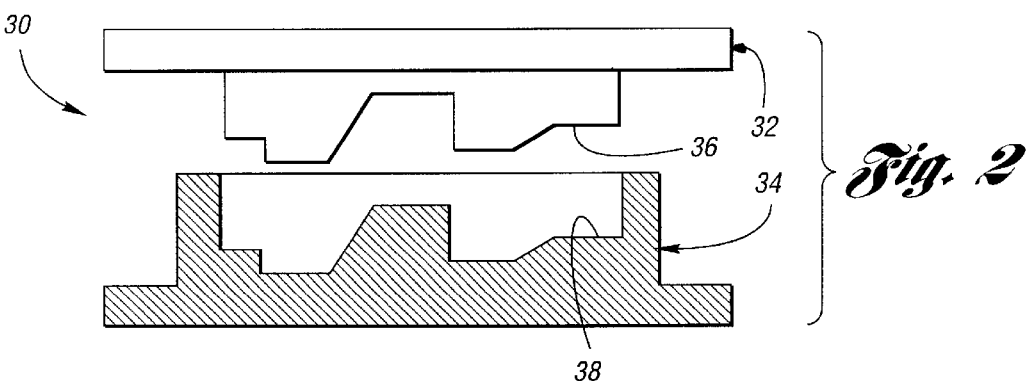
FIG. 2 is a schematic view of a compression mold partially in cross-section for forming a molded plastic component having enhanced surface finish in accordance with the present invention.

Referring now to FIG. 2, there is illustrated a compression mold, generally indicated at 30. The compression mold 30 includes first and second mold halves, generally indicated at 32 and 34, respectively, between which hot deposit blanks of glass-reinforced thermoplastic sheets are pressed between cool mold surfaces 36 and 38 of the first and second mold halves 32 and 34, respectively.

Figure 3:
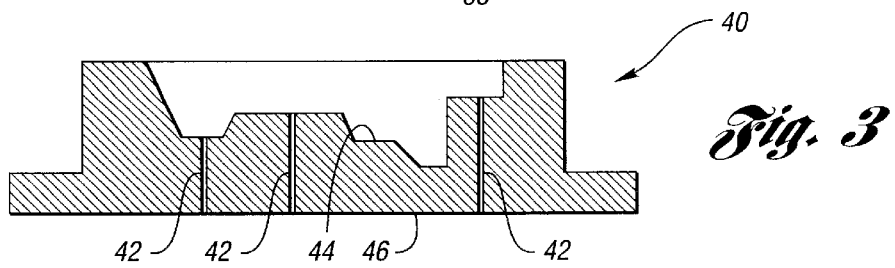
FIG. 3 is a schematic sectional view of a vacuum mold for forming a molded plastic component having enhanced surface finish in accordance with the present invention.

Referring now to FIG. 3, there is illustrated schematically a vacuum mold, generally indicated at 40. The mold 40 typically includes passages 42 which extend between inner and outer surfaces 44 and 46, respectively, of the mold 40 and through which a vacuum is drawn so that a heated plastic sheet conforms to the inner surface 44 of the mold 40.

Figure 4:
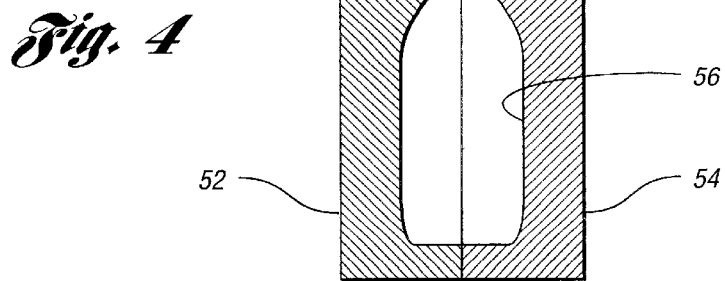
FIG. 4 is a schematic sectional view of a blow mold for forming a molded plastic component having enhanced surface finish of the present invention.

Referring now to FIG. 4, there is illustrated a blow mold, generally indicated at 50, including a pair of mold halves 52 and 54 which define an article or component-defining cavity 56. As is well known in the art, blow molding involves the extrusion of a molten tube of resin called a "parison" into the mold 50. The mold 50 then closes around the parison pinching the bottom of the parison closed. A gas such as air is then introduced into the mold 50 through an opening 58 causing the tube to expand against the inner surfaces of the first and second mold halves 52 and 54 which define the article-defining cavity 56.

Figure 5:
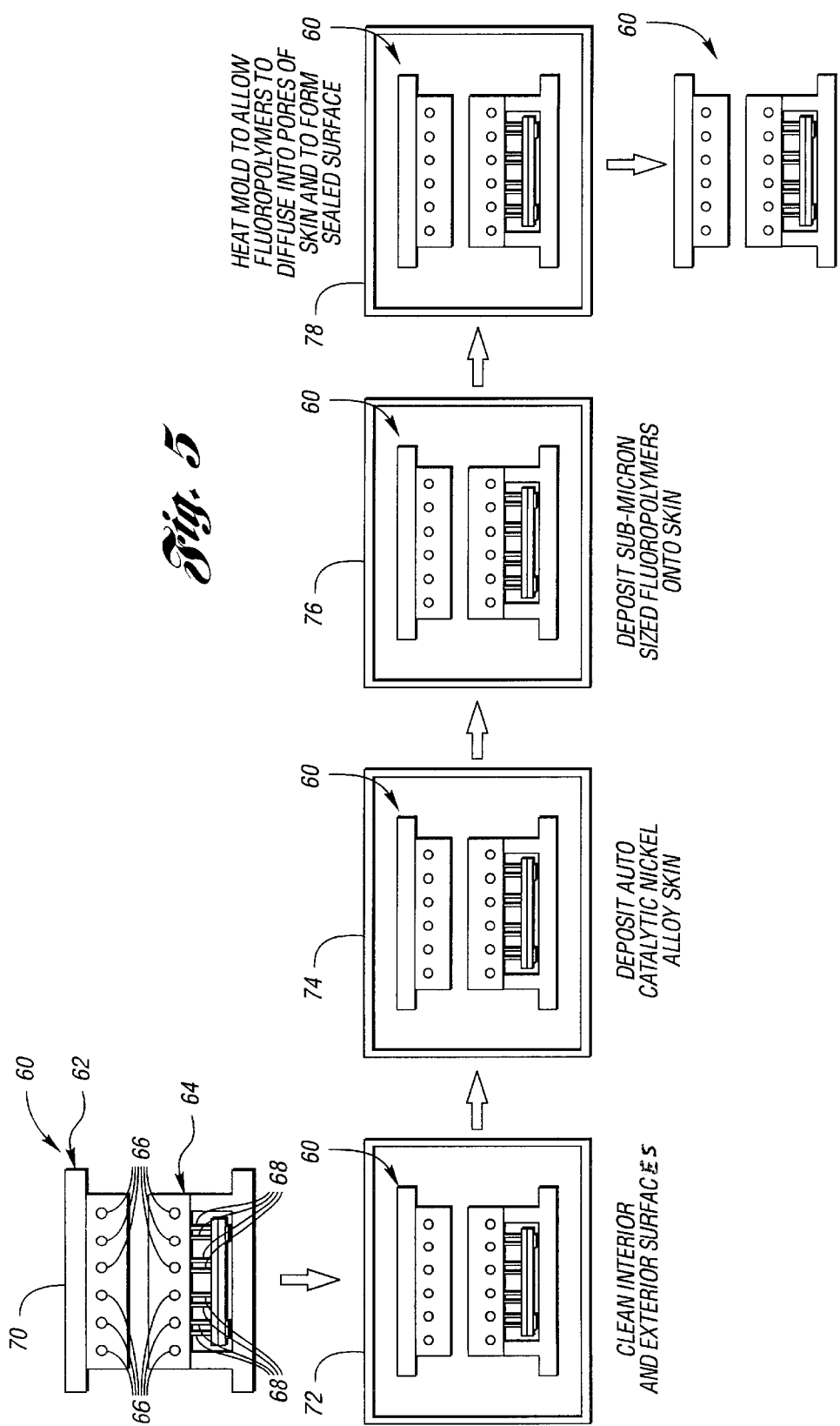
FIG. 5 is a processing diagram illustrating various steps for forming one or more self-lubricating surface layers on and in a mold which then is utilized to form molded plastic components having enhanced surface finish of the present invention.

Referring now to FIG. 5, there is illustrated a processing diagram for processing an injection mold, generally indicated at 60. However, it is to be understood that the processing of FIG. 5 can be performed on a compression mold, a vacuum mold or a blow mold, such as those illustrated in FIGS. 2, 3 and 4, respectively.

The injection mold 60 is generally of the same type as the injection mold 10 illustrated in FIG. 1 in that the mold 60 includes first and second mold halves, generally indicated at 62 and 64, respectively, a plurality of cooling lines 66 disposed in each of the mold halves 62 and 64, and a plurality of ejector pins 68. While not indicated in FIG. 5, the injection mold 60 typically includes one or more component or article-defining cavities and a resin flow path which extends from an outer exterior surface 70 of the mold 60 to the one or more article-defining cavities.

The first step in the process to transform the injection mold 60 into a mold which is capable of molding plastic components having enhanced surface features in accordance with the present invention is indicated at block 72. As indicated at block 72, all interior and exterior surfaces of the mold 60 for which it is desired to have a self-lubricating surface layer to facilitate the molding of a plastic component with enhanced surface features are cleaned to obtain clean "virgin metal" surfaces. Depending on the level of contamination of the tooling, the mold 60 is typically subjected to a solvent degrease, a high temperature bake, followed by another solvent degrease. The temperature of the bake is typically in the range of 650° to 750° F. Again, depending on the level of contamination, the cleaning which occurs at block 72 may include light mechanical cleaning after the high temperature bake. Such light mechanical cleaning may utilize fine glass media under low operating pressure.

Referring now to block 74, after the desired interior and exterior surfaces of the mold 60 have been cleaned, an autocatalytic nickel alloy skin is controllably grown or deposited on the previously cleaned surfaces by immersing the mold 60 in a liquid solution containing dissolved autocatalytic nickel alloy. The exact composition of the nickel alloy is dependent on the particular metal used in making the mold 60.

Preferably, the mold 60 is completely immersed in a solution containing the autocatalytic nickel alloy which is held at an elevated temperature typically in the range of 650° to 750° F. Typically, the thickness of the resulting autocatalytic nickel alloy skin is in the range of 0.0007 inches to 0.001 inches and is preferably approximately 0.001 inches. The resulting nickel alloy skin has a substantially uniform thickness +/−0.0003 inches. Consequently, the resulting nickel alloy skin very closely follows the original interior and exterior surfaces of the mold 60.

Referring now to block 76, the next step in the process is to deposit resin-based submicron-sized lubricating particles such as fluoropolymers onto the porous metallic skin previously formed on the mold surfaces at block 74. Typically, the particles are high temperature, low friction fluoropolymers. However, other lubricating particles could also be used as long as the lubricating particles do not contaminate the surface of the resulting plastic component.

Referring now to block 78, the mold 60 is then heated such as in an oven to allow the fluoropolymers to diffuse into the pores of the metallic skin and to form a sealed surface. In this way, fluoropolymers are infused into the pores of the skin and are sintered within the oven to provide a bonded or sealed surface. The resulting solid film lubricant can be described as a thin film of resin which binds the lubricating particles together.

The resulting self-lubricating surface layer thereby becomes an integral part of each mold surface to which it is exposed. The resulting coating is commonly referred to as an Endura® Series 203 coating. The process for making the coating is performed by Endura Coatings, Inc. of Warren, Mich. Processing times of the above process steps of FIG. 5 are generally dependent on part mass, configuration, surface preparation, base metal, area for cooling and masking, base metal contamination, coating thickness, and specific performance benefits which are desired.

Figure 6:
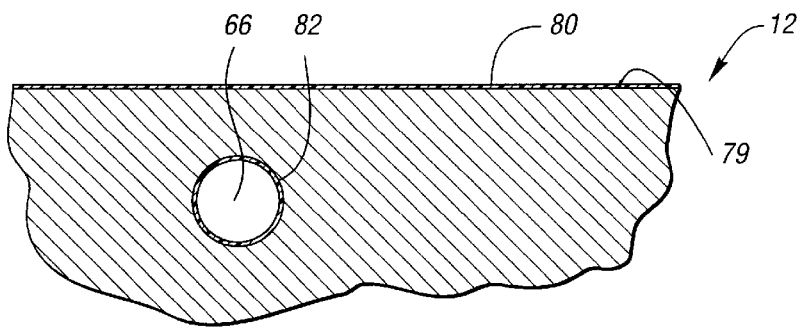
FIG. 6 is a view, partially broken away and in cross-section, of a metal base of a mold with two self-lubricating surface layers, which mold is used for forming molded plastic components having enhanced surface finish of the present invention.

Referring now to FIG. 6, there is illustrated an enlarged view, partially broken away and in cross-section, of the mold half 12 of FIG. 1 wherein a surface 79 has deposited thereon a self-lubricating surface layer 80 after the mold 10 has gone through the process steps illustrated in FIG. 5. Also illustrated is a self-lubricating surface layer 82 for one of the cooling lines 66. The self-lubricating surface layer 82 is also formed via the steps of FIG. 5. The layer 82 prevents the build-up of contaminants on the walls of the cooling line 66 due to such contaminants being in the water flowing through the cooling line 66.

The self-lubricating surface layer 80 provides a non-stick surface which allows the mold half 12 to be easily cleaned when the surface 79 is an exterior surface layer. When the surface 79 is an interior surface of the mold half 12, the self-lubricating surface layer 80 easily sheds or releases solidified plastic therefrom to provide an enhanced surface finish for the plastic component currently being molded as well as subsequently molded plastic components. Also, the self-lubricating surface layers allows easy sliding movement of the molten resin within the mold cavity 16 to minimize the effects of hesitation marks on the surface of the plastic component.

When the self-lubricating surface layer 80 defines part of the flow path that the resin takes as it travels from the exterior surfaces 20 to the component-defining cavity 16 (i.e., as in FIG. 1), not only does the self-lubricating surface layer 80 hinder sticking of solidified plastic thereto but also it facilitates sliding movement of the molten resin along the resin flow path as it travels from the exterior surface 20 to the component-defining cavity 16.

Figure 7:
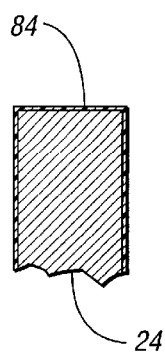
FIG. 7 is a view, partially broken away and in cross-section, of an ejector pin of a mold having a self-lubricating surface layer formed thereon and which is utilized to make molded plastic components having enhanced surface finish of the present invention.

Referring now to FIG. 7 there is illustrated the ejector pin 24 which also has a surface layer 84 formed on its exterior surface thereof also via the process steps of FIG. 5. The side surfaces of the surface layer 84 facilitate sliding movement of the ejector pin 24 within the mold half 14 whereas the top surface of the surface layer 84 helps to define the article-defining cavity 16 and prevents the plastic component molded therein from sticking to the top surface of the surface layer 84.

Figure 8:
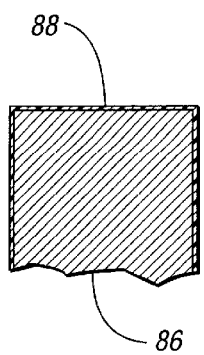
FIG. 8 is a view partially broken away and in cross-section of a core pin having a self-lubricating surface layer for use in a mold for forming a molded plastic component having enhanced surface finish of the present invention.

Referring now to FIG. 8, there is illustrated a core pin 86 also having a surface layer 88 formed thereon when the core pin 86 together with the lower mold half 14 is processed by the process steps indicated in FIG. 5. Again, as in the case of the ejector pin 24, the surface layer 88 of the core pin 86 helps to define the mold cavity in which the plastic component is molded and allows easy release from the plastic component in the open position of the mold 10. The ejector pin 24, as well as the core pin 86, may be in the mold half 14 when the processing steps take place.

Most, if not all other mold components such as ejector pins and core pins, are preferably coated with the self-lubricating surface layer described above. Such mold components include, but are not limited to, cavity, core, slides, lifters, core pins, manifolds, mixer blocks, nozzles, sprue bushings, ribs, bosses, etc.

Figure 9:
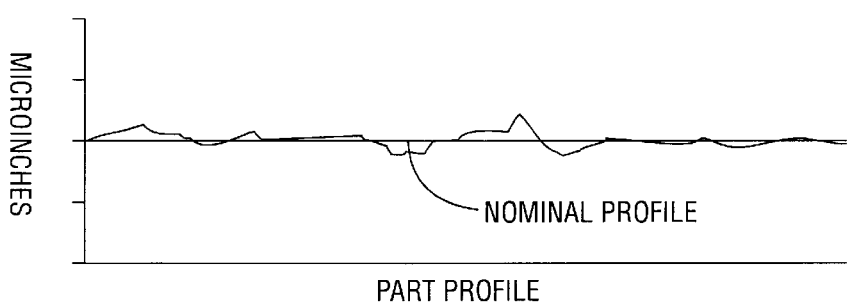
FIG. 9 is a graph of the profile of a plastic part molded in a mold without a self-lubricating surface layer.

Referring now to FIG. 9, there is illustrated in graphical form a part profile of a plastic component molded in the mold 10 or the mold 60 without the benefit of the self-lubricating surface layers provided by the processing of the process steps shown in FIG. 5.

Figure 10:
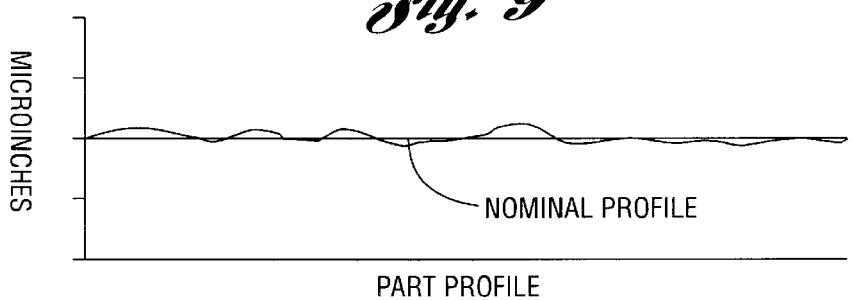
FIG. 10 is a graph illustrating the profile of a plastic part molded in a mold with a self-lubricating surface layer.

Referring now to FIG. 10, there is illustrated in graphical form a part profile of a part molded in the mold 10 or 60 after the formation of the self-lubricating surface layers obtained after the process steps illustrated in FIG. 5. The part profile of FIG. 10 is to be compared with the part profile illustrated in FIG. 9 wherein the part profile of FIG. 10 is much smoother and conforms more readily to a nominal part profile. This indicates that a plastic component molded within a mold having the previously described self-lubricating surface layers formed thereon its surfaces which define the mold cavity has an enhanced surface finish and especially a surface finish which does not have a tendency to stick to the inner surface of the article-defining cavity. When such sticking occurs, plastic particles are often left behind which eventually requires that the mold surfaces be cleaned and/or results in future contaminated parts.

Figure 11:
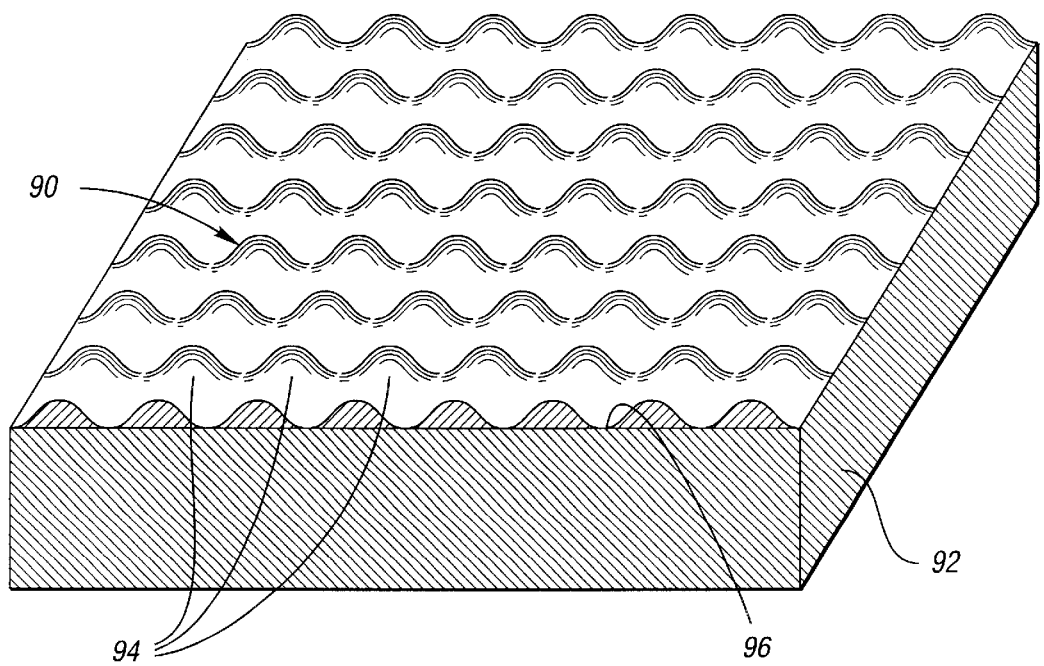
FIG. 11 is a perspective view, partially broken away, of a porous metallic skin including sinusoidally-shaped projections integrally connected to and extending from a surface of a metal base of a mold.
Figure 12:
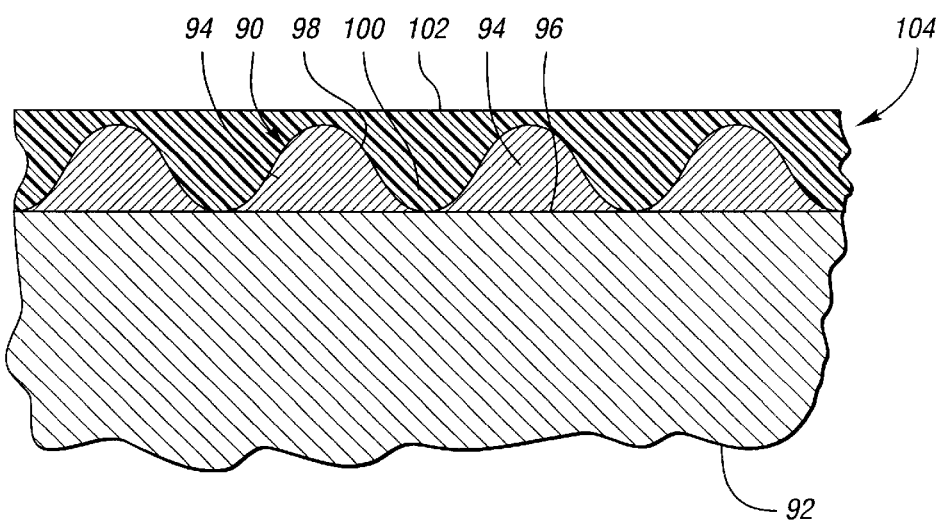
FIG. 12 is a view, partially broken away and in cross-section, of lubricating particles disposed on a pair of adjacent sinusoidally-shaped projections of the skin and in a pore therebetween where the lubricating particles are bonded together to form a sealed surface such that molded plastic components molded in a mold having the surface layer have enhanced surface finish.

Referring now to FIG. 11, there is schematically illustrated an enlarged, broken-away perspective view of the autocatalytic nickel skin, generally indicated at 90, formed on a metal base 92 after the step of block 74 of FIG. 5. The skin 90 includes a plurality of sinusoidally-shaped projections 94 which are integrally connected to and extend from a surface 96 of the metal base 92. The surface may be an interior or exterior surface of a mold. Between adjacent projections 94 there are formed pores 98 in which the lubricating particles 100 are bonded together with their resin to form a sealed surface 102 of a self-lubricating surface layer, generally indicated at 104 in FIG. 12.

The thickness of the self lubricating surface layer 104 between the surface 96 and the surface 102 is generally very uniform to within +/−0.0002 inches so that the resulting surface finish is substantially identical to the original surface finish provided by the surface 96. Consequently, it is important that the original surface 96 be completely cleaned so that bare "virgin" metal surface is provided. Because of the uniformity of thickness of the self-lubricating surface layer 104, any contamination appearing on the surface 96 will be reflected on the surface 102. Therefore, it may be necessary to include light mechanical cleaning of the surface 102 after the baking step indicated at block 78 of FIG. 5. Such light mechanical cleaning typically utilizes fine glass media under low operating pressure.

While the best mode for carrying out the invention has been described in detail, those familiar with the art to which this invention relates will recognize various alternative designs and embodiments for practicing the invention as defined by the following claims.

What is claimed is:

1. An article of manufacture comprising a finished configuration having an enhanced surface and made of plastic formulated to eliminate or reduce the need to include a release agent and formed by molding the plastic in a mold having at least one metal base, a mold cavity at least partially defining the plastic configuration, and at least one self-lubricating surface layer having a substantially uniform thickness for further defining the plastic configuration within the mold cavity, the at least one self-lubricating surface layer including a porous metallic skin including a plurality of substantially uniformly-shaped projections integrally connected to and extending from an interior surface of the at least one metal base and lubricating particles disposed on the skin and in pores of the skin, wherein the lubricating particles are bonded together to form a sealed surface of the at least one self-lubricating surface layer, the mold has a resin flow path extending from an outer surface of the mold to the mold cavity and the resin flow path has the self-lubricating surface layer, whereby the finish of the molded plastic configuration is further defined to provide the enhanced surface.

2. The article of claim 1 wherein the interior surface of at least one metal base has substantially the same shape as the surface layer.

3. The article of claim 2 wherein the substantially uniform thickness is in the range of 0.0007 to 0.001 inches.

4. The article of claim 3 wherein the substantially uniform thickness is approximately 0.001 inches.

5. The article of claim 1 wherein the metallic skin includes a plurality of sinusoidally-shaped projections.

6. The article of claim 5 wherein the metallic skin is a nickel alloy.

7. The article of claim 6 wherein the nickel alloy is an autocatalytic nickel alloy.

8. The article of claim 1 wherein the lubricating particles are submicron-sized particles of low friction fluoropolymers.

9. The article of claim 1 wherein the mold has a pair of metal bases and wherein each of the metal bases has the self-lubricating surface layer.

10. The article of claim 9 wherein the configuration is injection molded.

11. The article of claim 9 wherein the configuration is compression molded.

12. The article of claim 9 wherein the configuration is blow molded.

13. The article of claim 1 wherein the configuration is vacuum molded.

14. The article of claim 1 wherein the configuration is reaction injection molded.

15. The article of claim 1 wherein the plastic is polyurethane.

16. The article of claim 1 wherein the plastic is polypropylene.

17. The article of claim 1 wherein the plastic is SMC.

18. The article of claim 1 wherein the mold has an ejector pin and wherein the ejector pin has the self-lubricating surface layer which defines the molded configuration within the mold cavity.

19. The article of claim 1 wherein the mold has a core pin and wherein the core pin has the self-lubricating surface layer which defines the molded component within the mold cavity.

20. The article of claim 1 wherein the mold has a cooling line formed within the at least one metal base, the cooling line having the self-lubricating surface layer whereby build-up of contaminants within the cooling line are hindered.

21. The article of claim 1 whereby build-up of plastic along the resin flow path is hindered.

22. The article of claim 21 wherein the outer surface of the mold has the self-lubricating surface layer whereby build-up of surface contaminants on the outer surface of the mold are hindered.

23. A molded plastic component made from plastic formulated with reduced levels of release agent and having an enhanced surface finish, the molded plastic component manufactured by a process comprising molding plastic in a mold having a pair of metal bases, a mold cavity having an interior surface to finish the molded plastic component, and a self-lubricating surface layer formed on an interior surface of each of the metal bases wherein each of the self-lubricating surface layers has a substantially uniform thickness and wherein the self-lubricating surface layers define the plastic component within the mold cavity, each of the self-lubricating surface layers including a porous metallic skin includes a plurality of substantially uniformly-shaped projections integrally connected to and extending from the interior surface of its metal base and lubricating particles disposed on each skin and in pores of each skin, wherein the lubricating particles are bonded together to form a sealed surface of each self-lubricating surface layer, the mold has a resin flow path extending from an outer surface of the mold to the mold cavity and the resin flow path has the self-lubricating surface layer.

24. A molded plastic component made from plastic formulated with reduced levels of release agent and having an enhanced surface finish, the molded plastic component manufactured by a process comprising molding plastic in a mold having a pair of metal bases, a mold cavity, a resin flow path extending from an outer surface of the mold to the mold cavity, and a self-lubricating surface layer formed on an interior surface of each of the metal bases and along the resin flow path whereby build-up of plastic along the resin flow path is hindered, wherein each of the self-lubricating surface layers has a substantially uniform thickness and wherein the self-lubricating surface layers formed on the interior surfaces of the metal bases define the plastic component within the mold cavity, each of the self-lubricating surface layers including a porous metallic skin includes a plurality of substantially uniformly-shaped projections integrally connected to and extending from the metal bases and lubricating particles disposed on each skin and in pores of each skin, wherein the lubricating particles are bonded together to form a sealed surface of each self-lubricating surface layer.

* * * * *